United States Patent [19]

Martinez et al.

[11] Patent Number: 4,632,444
[45] Date of Patent: Dec. 30, 1986

[54] ROBOT HAND

[75] Inventors: Miguel R. Martinez, Mercer County; William A. Dischert, Burlington County, both of N.J.

[73] Assignee: RCA Corporation, Princeton, N.J.

[21] Appl. No.: 730,060

[22] Filed: May 3, 1985

[51] Int. Cl.$^4$ .............................................. B25J 15/00
[52] U.S. Cl. ................................... 294/86.4; 294/88; 294/104; 294/902; 901/37; 901/39
[58] Field of Search ...................... 294/86.4, 88, 99.1, 294/902, 104, 87.1, 119.1; 901/30, 31, 36, 37, 39; 269/32, 90, 224, 265, 267, 275; 414/5, 6, 730, 735

[56] References Cited

U.S. PATENT DOCUMENTS

| 4,017,978 | 4/1977 | Peruchon et al. | 33/174 |
| 4,521,685 | 6/1985 | Rebinan | 901/33 |
| 4,572,564 | 2/1986 | Cipolla | 294/88 |

FOREIGN PATENT DOCUMENTS

| 0146209A1 | 6/1985 | European Pat. Off. |
| 53-7071 | 1/1978 | Japan . |
| 2148239A | 5/1985 | United Kingdom . |
| 724338 | 3/1980 | U.S.S.R. . |

OTHER PUBLICATIONS

"Gripping Device Provides Robots with 'Sense of Touch'," *Research & Development*, Aug. 1985, pp. 58-60.

*Primary Examiner*—James B. Marbert
*Attorney, Agent, or Firm*—Joseph S. Tripoli; William Squire

[57] ABSTRACT

A robotic hand is provided with an array of movable spring loaded fingers and an assembly opposed to the fingers. An object to be grasped by the hand is pushed by the assembly toward and into contact with the fingers. An electrical signal is produced when each finger is contacted by the object. The time intervals between various finger contacts are measured and used to calculate the distance that the object moved during those intervals. These distances provide information about the shape of the object which can be used to differentiate between objects of various shapes.

12 Claims, 3 Drawing Figures

ROBOT HAND

The present invention relates to robot hands and particularly to such hands for sensing the shape of the object grasped by the hand.

BACKGROUND OF THE INVENTION

Robotic devices used in manufacturing often include a hand comprising two opposed surfaces which can move toward each other so as to grasp an object. Such hands may include a sensor on one or both of the opposing surfaces to produce a signal indicating when contact has been made with the object. The signal generated is often employed to terminate the movement of the two surfaces toward one another so as to gently grasp the object without crushing it.

When such robotic devices are used to assemble various components, the robot must be able to distinguish between the various components. Quite commonly this is done by physically locating and orientating the components of each type in a different location from each of the other component types. The robot is computer controlled such that when it needs a component of a given type it goes to the area where those components are located. In certain applications, however, it is advantageous to provide the robot with a mechanism by which it can sense the shape of the object being grasped so as to distinguish between various objects of different shapes or between different orientations of the same object. The robotic hand described above which has a single sensor mounted on each opposing surface provides only an indication of when the object has been firmly grasped and not of the shape or orientation of the object.

SUMMARY OF THE INVENTION

A robotic hand for sensing the shape of an object includes an array of fingers. An apparatus is provided for moving at least some of the fingers and the object into contact with each other. An indicator is provided for producing an electrical signal identifying when the object contacts each of the fingers.

DETAILED DESCRIPTION OF THE INVENTION

Figure 1:
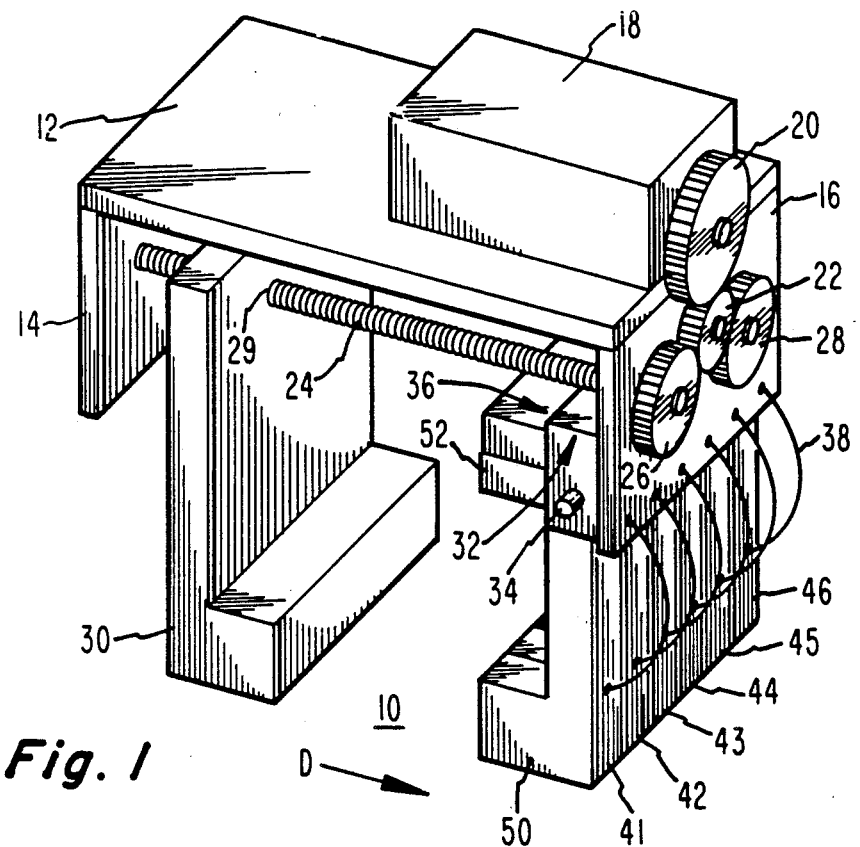
FIG. 1 is a perspective view of a robotic hand according to the present invention.

With initial reference to FIG. 1, a robotic hand 10, which may be positioned at the end of a robot arm (not shown), comprises a flat platform 12 having two side walls 14 and 16 depending therefrom. On the upper surface of platform 12 is a synchronous electric motor 18 having a shaft with a motor gear 20 mounted thereon. Sidewall 16 has a shaft on which a first gear 22 is mounted so as to mesh with motor gear 20.

Extending between the sidewalls 14 and 16 are two threaded rods 24 (only one rod is visible in the view of FIG. 1). Mounted on the ends of the threaded rods 24, which extend through wall 16, are a third gear 26 and a fourth gear 28 so that each of the third and fourth gears mesh with the first gear 22. The two rods 24 are also threaded through apertures 29 in a pushing assembly 30 located between the sidewalls 14 and 16. When the rods are driven by the gears, pushing assembly 30 will move smoothly between the side walls 14 and 16. The synchronous motor 18 drives the pushing assembly at a substantially constant velocity.

Located on the inner surface of the second sidewall 16 is a pivot assembly 32 having a shaft 34 running parallel to the inner surface of the sidewall 16. Mounted on the shaft 34 is an array of six fingers 41 through 46. Located on the pivot assembly 32 above each of the fingers 41–46 is a switch assembly 36, which consists of a series of six electrical switches each associated with a separate one of the fingers. A series of six springs 38 extend between the side wall 16 and one of the fingers 41 through 46 to bias the fingers against the switch assembly 36 in the position shown in FIG. 1.

The fingers 41 through 46 have a shape which in the view of FIG. 1 is that of a backwards C. Each finger having a lower leg portion 50 and an upper leg portion 52. The upper surface of the upper leg portion 52 of each finger contacts a separate one of the switches in assembly 36. In its normally biased position, as shown in FIG. 1, the upper surface of each finger pushes against switch assembly 36 placing each switch in a first position.

Figure 2:
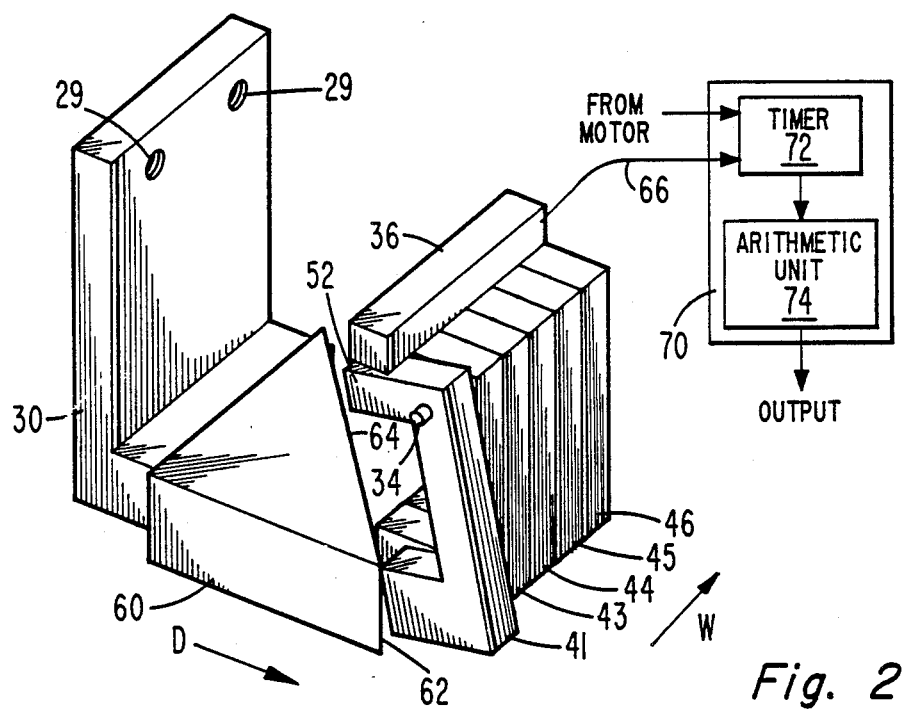
FIG. 2 is a schematic diagram of a portion of the hand in FIG. 1 grasping an object.

The robot hand 10 can be maneuvered by the robotic arm (not shown) so that an object to be grasped falls between the pusher assembly 30 and the fingers 41–46. The motor 18 is then energized to turn the gears and threaded shafts 24 which propels the assembly 30 toward the fingers in direction D. As shown in FIG. 2 the driver assembly 30 pushes the object 60 toward the array of fingers. The particular object 60 is triangular shaped so that the apex 62 will strike the first finger 41 before striking any of the other fingers. The continued movement of the assembly 30 pushes the object 60 farther toward the fingers causing the first finger 41 to pivot about the shaft 34. This pivoting causes the upper leg 52 of the finger to move away from the switch assembly 36. This results in the switch associated with the first finger 41 to move from the first position, which it assumed during the quiscent state shown in FIG. 1, to a second position. This switching produces an electrical signal from that switch on cable 66 indicating that the object has been pushed against the first finger 41.

As the pusher assembly 30 continues to move the object toward the fingers, the surface 64 closest to the fingers will sequentially contact the various fingers producing an electrical signal from their corresponding switches in switch assembly 36. Eventually the first finger contacted is moved to the limit of its travel at which point the pushing assembly 30 and the object stop moving. Because the motor moves the assembly 30 at a constant velocity, the time of full travel along direction D is known. After this time has elapsed or upon sensing the assembly 30 stopping, power to the motor 18 may be switched off or reduced so as to firmly grasp the object in the hand against the fingers. Once the object 60 is grasped between the assembly 30 and the fingers, it can be moved to a new location. When the object is to be released, the motor is reversed to move the pusher assembly 30 back toward wall 14 to a preset rest position. Limit switches (not shown) may be provided to prevent the pusher 30 from travelling too far in either direction.

Alternatively, the same grasping function can be provided by allowing the entire hand 10 to move while the object 60 remains stationary. Specifically after the assembly 30 contacts the object, the array of fingers 41–46 is drawn toward and into contact with the object. Once the object is firmly grasped between the assembly 30 and the fingers 41–46, it may be moved by the hand. The movement of the fingers toward the object provides the same shape determining function as when the object is moved toward the fingers. Although the present description is in terms of the object moving, the present invention is not so limited and also covers the fingers moving toward the object as well as movement of both the fingers and the object.

The output from each of the switches in assembly 36 may be coupled to a general purpose programmable computer, such as would be included for controlling the entire robot. The computer can be programmed to measure the period of time from the activation of the motor 18 to the activation of the switch associated with the first finger contacted by the object (in this case finger 41). The intervals between the activation of the switch associated with the first finger contacted by the object and the activation of the switches associated with each of the other fingers is also measured by the computer. Because a synchronous motor 18 is used, the pusher assembly 30 and, hence, object 60 will move at a substantially constant rate toward the fingers 41–46. As the assembly's velocity is a substantially constant known value, the distances that it travels during the various time intervals can be calculated. Distance equals the velocity multiplied by the time interval. These distances represent the amount that the distance between the pusher assembly 30 and the array of fingers 41–46 has decreased during the respective intervals.

For example, a special purpose computing device 70, shown in FIG. 2 can be used to calculate the distance the assembly moved between various events. A timer 72 in device 70 receives a signal from the motor 18 indicating when it starts moving assembly 30 toward the fingers. The signal from the switch assembly 36 is connected via cable 66 to the timer 72. The timer measures the interval of time between when the motor starts to when the first of the fingers is contacted and also the intervals from when the first finger is contacted to when each of the other fingers is contacted. This interval data is fed from the timer 72 to an arithmetic unit 74 which calculates the distance travelled using the substantially constant known velocity of the pusher assembly 30 and the time intervals from the timer. The distances calculated by the arithmetic unit 74 may be outputted to another device as an indication of the object's shape.

Alternatively, because the distance is proportional to the time intervals by a constant (i.e. velocity), the arithmetic unit 74 may be eliminated and the time intervals used directly for shape indication.

The assembly 30 always starts moving toward the fingers from the same known rest position near wall 14. The time period from the motor 18 starting the pusher assembly's movement until the first of the switches is activated is used to calculate the distance the assembly 30 moved before pushing the object 60 into contact with the first finger. This distance is inversely proportional to the thickness of the object 60 along direction D (i.e. the farther the assembly 30 moves before the contact is made, the thinner the object). This calculated distance may be subtracted from the distance between the fingers 41–46 and the assembly 30 at the rest position to derive the object's thickness. This thickness information is useful in identifying the object.

The other calculated distances equal the distances along direction D from the first point of contact by the object 60 with a finger (apex 62) to each other point of finger contact on the object. The width of each finger along direction W is also known. From the distance and width information a two dimensional contour of object surface 64 can be determined which may be used by the robot to identify the object. Therefore, the pattern of switch activation and the times at which each switch activates provides a signature for various shaped objects. This pattern and the thickness of the object are used to enable the robot to identify the object and its orientation. The information may also be used to determine the position of the object in the hand along direction W. For example, if the object 60 was positioned in FIG. 2 farther away from the viewer, apex 62 might strike finger 43 making it the first finger contacted.

As seen in the example of FIG. 2, the surface 64 when pushed against the fingers 41 through 46 will provide a sequential activation of the switches beginning with finger 41 and continuing in series through finger 45 or 46 depending upon the width of the object. If the object was changed to a cylinder, the first contact would be at one of the center fingers and the pattern of closure would be sequentially symmetrical outward from that finger. The general purpose computer would therefore be able to distinguish between a triangular shaped object as shown in FIG. 2 and a cylindrical object.

By providing thinner fingers and a greater number of them along dimension W in FIG. 2, a higher degree of resolution of the surface contour of the object 60 may be produced providing a greater ability to differentiate between objects. For example, with relatively thin fingers the difference in shape between a circular cross section cylinder and a hexagonal cross section cylinder-like object may be determined.

Figure 3:
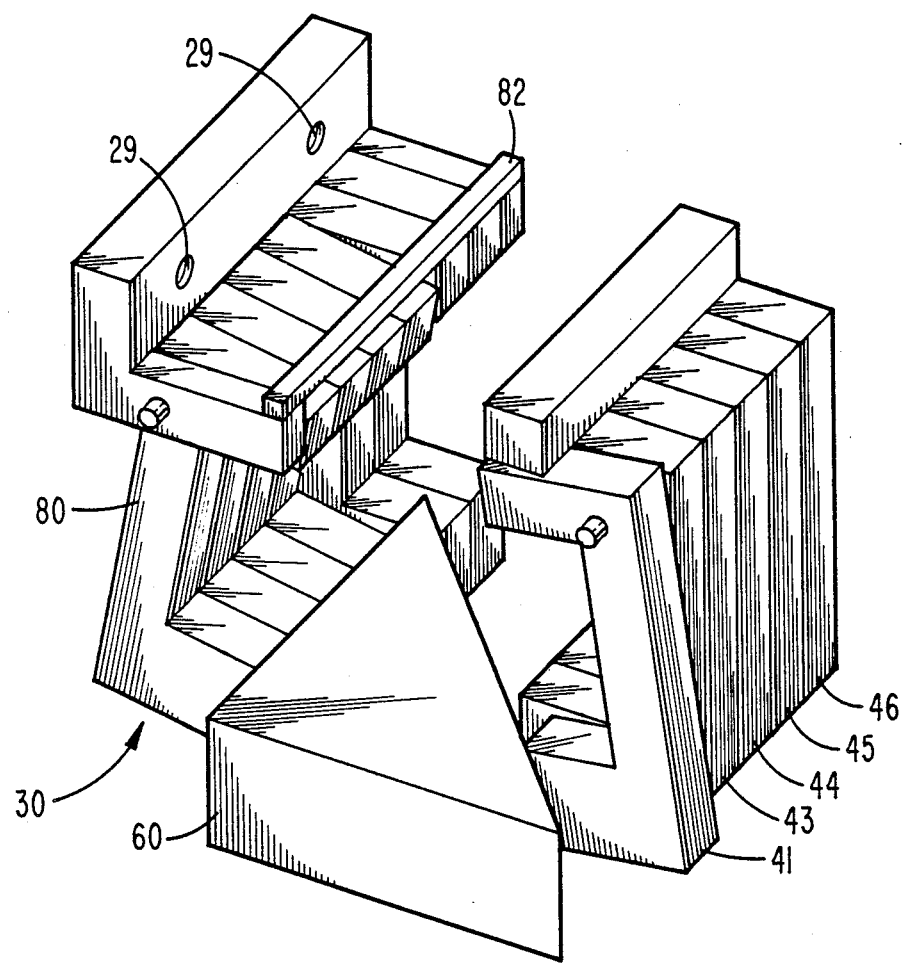
FIG. 3 is a schematic similar to FIG. 2 of an alternative embodiment of the present invention.

Alternatively, as shown in FIG. 3, the pusher assembly 30 may also include a second array of fingers 80, similar to fingers 41–46, and a switch assembly 82 associated with the fingers 80. The fingers of the second array are biased by springs (not shown) similar to the springs 38 in FIG. 1. In this case, the spring force on the second set of fingers 80 would be significantly greater than or less than the spring force on the first set of fingers so that the all of the fingers in one array will be depressed and the corresponding switches activated before the any of the fingers in the other array become depressed. This alternative embodiment would provide an output which indicates the shape of two opposing sides of the object 60 enabling further differentiation between objects.

Motor 18 does not necessarily have to be a synchronous motor providing a constant rate of travel to the pusher assembly 30. As an alternative, a sensor could be provided which continuously monitors the position of the assembly 30 along shafts 24 providing a direct indication of the assembly's position with respect to the array of fingers when each of the fingers contacts the object 60. In this latter variation, the measurement of the various time intervals need not be made in order to determine the shape of the object, rather the difference among the corresponding position data at the time of the switching provides the distance between various contact points. Furthermore, with this direct distance sensing embodiment, the motor 18 and gears 20, 22, 26 and 28 may be replaced by another drive means, such as a hydraulic cylinder, as a constant rate of object movement is no longer essential.

We claim:

1. A robotic hand for grasping an object and sensing its shape, said hand comprising:
   a first array of fingers;
   means for grasping said object against at least some of the fingers in said first array; and
   a first means for producing an electrical signal identifying when the object contacts each of at least some of the fingers.

2. The hand as in claim 1 wherein said means for producing an electrical signal comprises a plurality of electrical switches, each being connected to a different finger.

3. The hand as in claim 1 wherein said object grasping means comprises:
   an assembly opposed to said first array of fingers; and
   drive means for moving said assembly toward to said first array of fingers.

4. The hand as in claim 3, wherein said assembly comprises:
   a second array of fingers; and
   a second means for producing an electrical signal identifying when the object contacts each of at least some of the fingers in the second array.

5. The hand as in claim 4 wherein each of said first and second means for producing an electrical signal comprises a plurality of electrical switches, each associated with a different finger in said first and second arrays of fingers.

6. The hand in claim 3 wherein the drive means moves said assembly at a substantially constant velocity.

7. A system for determining the shape of an object comprising:
   a plurality of fingers arranged in a first array;
   means for grasping said object against at least some of the fingers in said first array;
   a first means for producing an electrical signal identifying when the object contacts each of at least some of the fingers in said first array; and
   means responsive to said electrical signal for determining the shape of the object.

8. The hand as in claim 7 wherein said object grasping means comprises:
   an assembly opposed to said first array of fingers for contacting the object; and
   a drive means for moving said assembly toward said first array of fingers.

9. The system as in claim 8 wherein said drive means moves said assembly at a constant velocity; and
   wherein said shape determining means comprises:
   first time measuring means for providing an output signal indicating the time periods between when the object contacts the first of the fingers to when each other finger is contacted by the object, if such other fingers are contacted; and
   means for calculating the distance the object was moved between contacting various fingers, said calculation being based on the output signal from said time measuring means and the velocity at which the object was moved.

10. The system as in claim 9 further comprising:
    second time measuring means for providing another output signal indicating the time period between when said drive means begins moving said assembly toward said array of fingers to when the object contacts the first of the fingers; and
    means responsive to said second time measuring means for determining the distance the object moved during the period measured by said second time measuring means.

11. A system for determining the shape of an object comprising:
    a plurality of fingers arranged in an array;
    means for moving at least some of the fingers in said array and the object into contact with each other;
    a first means for producing an electrical signal identifying when the object contacts each of at least some of the fingers in said array; and
    means responsive to said electrical signal for determining the shape of the object.

12. The system as in claim 11 wherein moving means moves said assembly at a constant velocity; and
    wherein said shape determining means comprises:
    first time measuring means for providing an output signal indicating the time periods between when the object contacts the first of the fingers to when each other finger is contacted by the object, if such other fingers are contacted; and
    means for calculating the distance the object was moved between contacting various fingers, said calculation being based on the output signal from said time measuring means and the velocity at which the object was moved.

* * * * *